Figure 1:
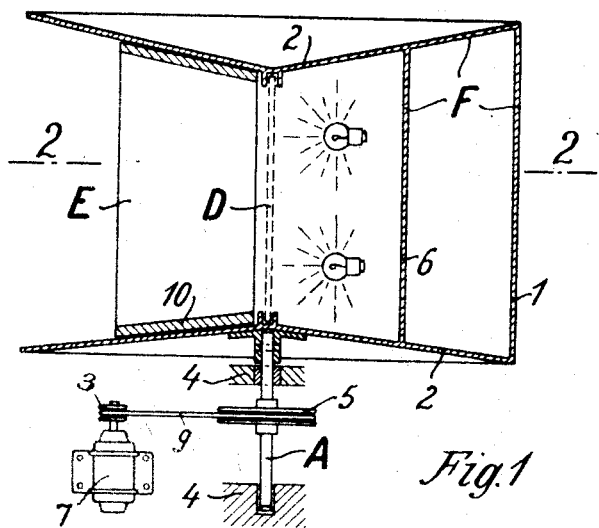

Oct. 27, 1931.　　　A. SCHREIBER　　　1,829,113

DISPLAY APPARATUS

Filed June 8, 1928　　　4 Sheets-Sheet 1

Inventor:
August Schreiber
by Emery, Booth, Varney & Townsend
Attys

Oct. 27, 1931.  A. SCHREIBER  1,829,113
DISPLAY APPARATUS
Filed June 8, 1928  4 Sheets-Sheet 2

Inventor:
August Schreiber
by Emery, Booth, Varney & Townsend
Attys

Oct. 27, 1931.  A. SCHREIBER  1,829,113
DISPLAY APPARATUS
Filed June 8, 1928  4 Sheets-Sheet 4

Inventor:
August Schreiber
by Emery, Booth, Varney & Townsend
Attys

Patented Oct. 27, 1931

1,829,113

UNITED STATES PATENT OFFICE

AUGUST SCHREIBER, OF FRIEDERSDORF, NEAR JAGERNDORF, CZECHOSLOVAKIA

DISPLAY APPARATUS

Application filed June 8, 1928, Serial No. 283,838, and in Germany June 11, 1927.

My invention relates to improvements in display apparatus, and the object of the invention is to provide a device for displaying pictures or signs which are visible from all sides. With this object in view, my invention consists in producing or projecting the picture or sign on a rotary carrier or casing and providing a shutter or screen which gives a view to said picture or sign substantially in the direction perpendicular to the plane of said picture or sign, whilst in other directions relatively to said picture, the view of said picture is hidden.

The invention consists furthermore in driving the casing, the screen and picture with such a velocity that, in every direction of view from a circumferential plane about the device, the successive displays of the picture to the eye, for every direction in which the picture may be seen, produce an impression of a continuously displayed picture.

The picture or sign may be of any kind or form appropriate to be seen from outside when suitably lighted, being, for instance, translucent or being projected in an appropriate way. The picture may be a band of separate pictures following each other, such, for instance, as a film band.

In a preferred embodiment of my invention, the screen comprises a set of parallel plates substantially perpendicular to the plane or planes of said picture, sign or the like. These plates, which are of slight thickness, are in front of the picture or the like, extend outwardly, and are revolved together with the casing at such a velocity that, to any observer who inspects the device from a circumferential plane, the picture is revealed and concealed alternately at short intervals; that is to say, the picture, or its projection, faces the observer through the slits of the screen for a brief interval of time, and is then covered by reason of the inclination of the plates to the line of vision. As those intervals follow each other rapidly, to an observer who inspects the device from any direction, the successive displays of the picture to the eye produce an impression of a continuously displayed picture.

In a further embodiment of my invention, a carrier or drum for supporting the film band of pictures is arranged extraneously of the body containing the screens, and there is employed an optical system to project those pictures to the screen body and from there to the observer.

Other objects of the improvements will appear from the following description of the invention.

Figure 3:
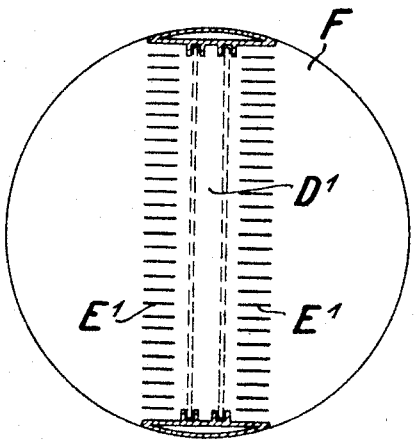
Figure 4:
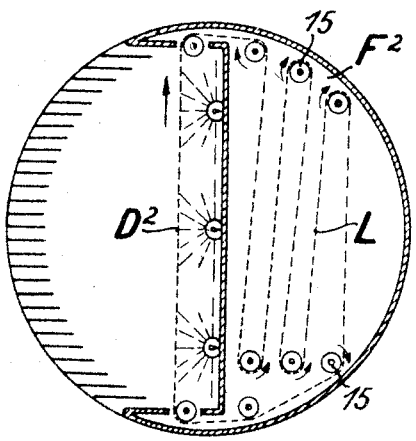
Figure 5:
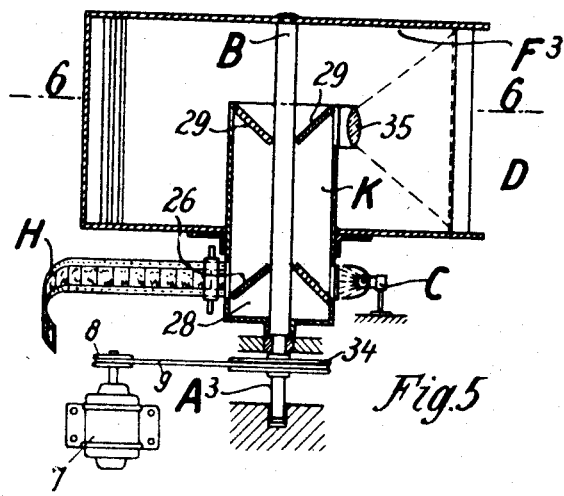
Figure 6:
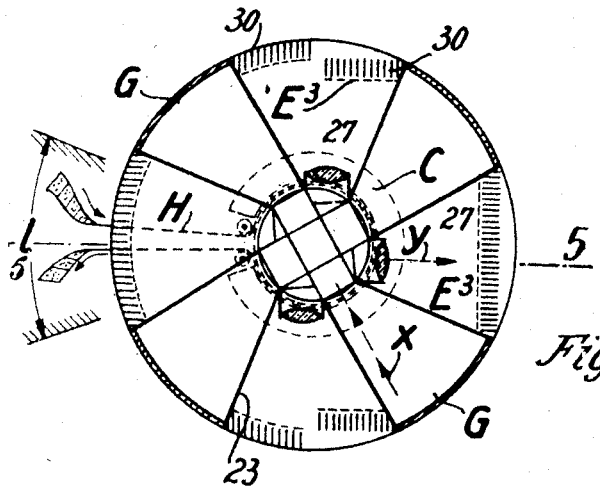
Figure 8:
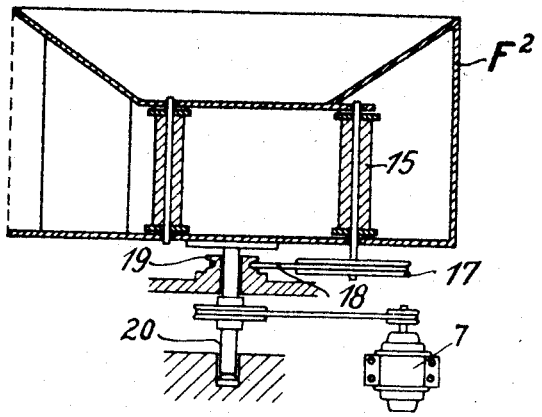
Figure 9:
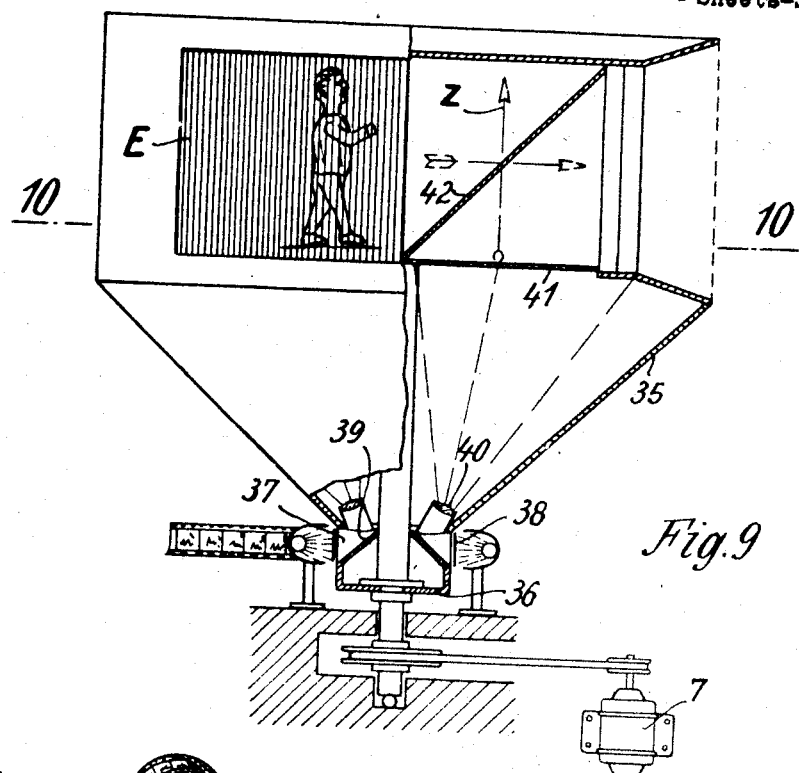
Figure 10:
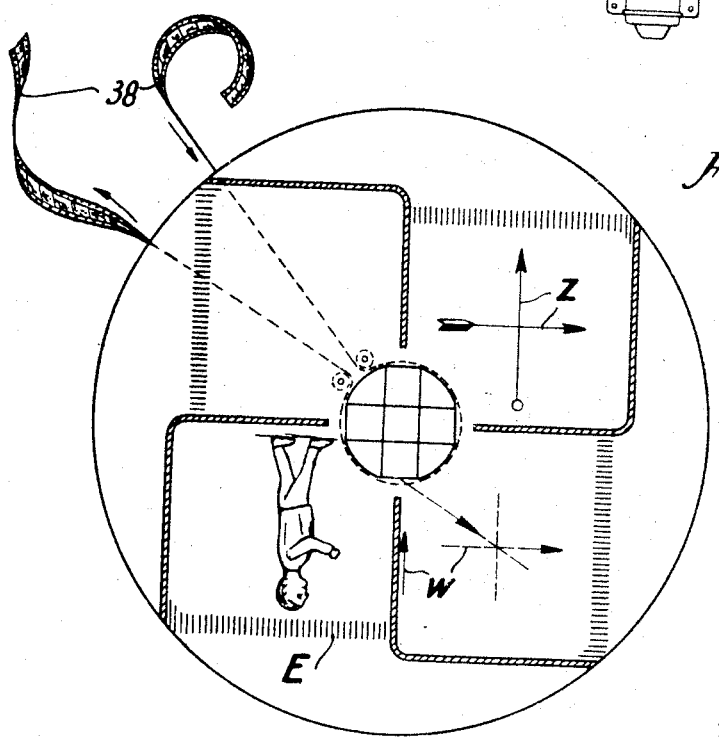
Figure 11:
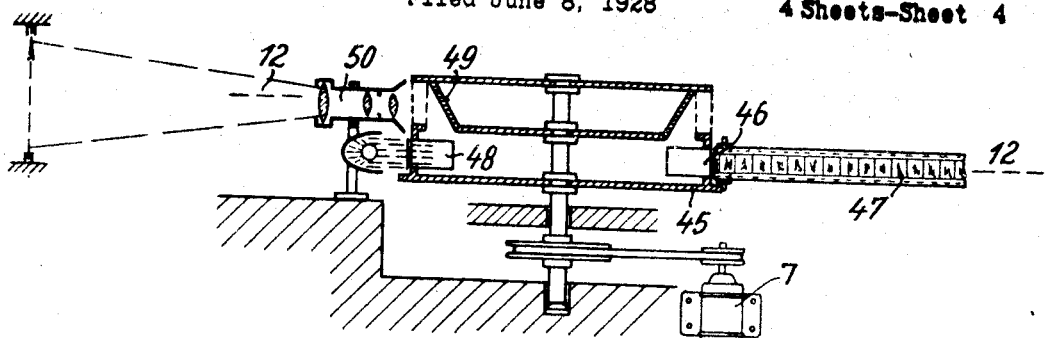
Figure 12:
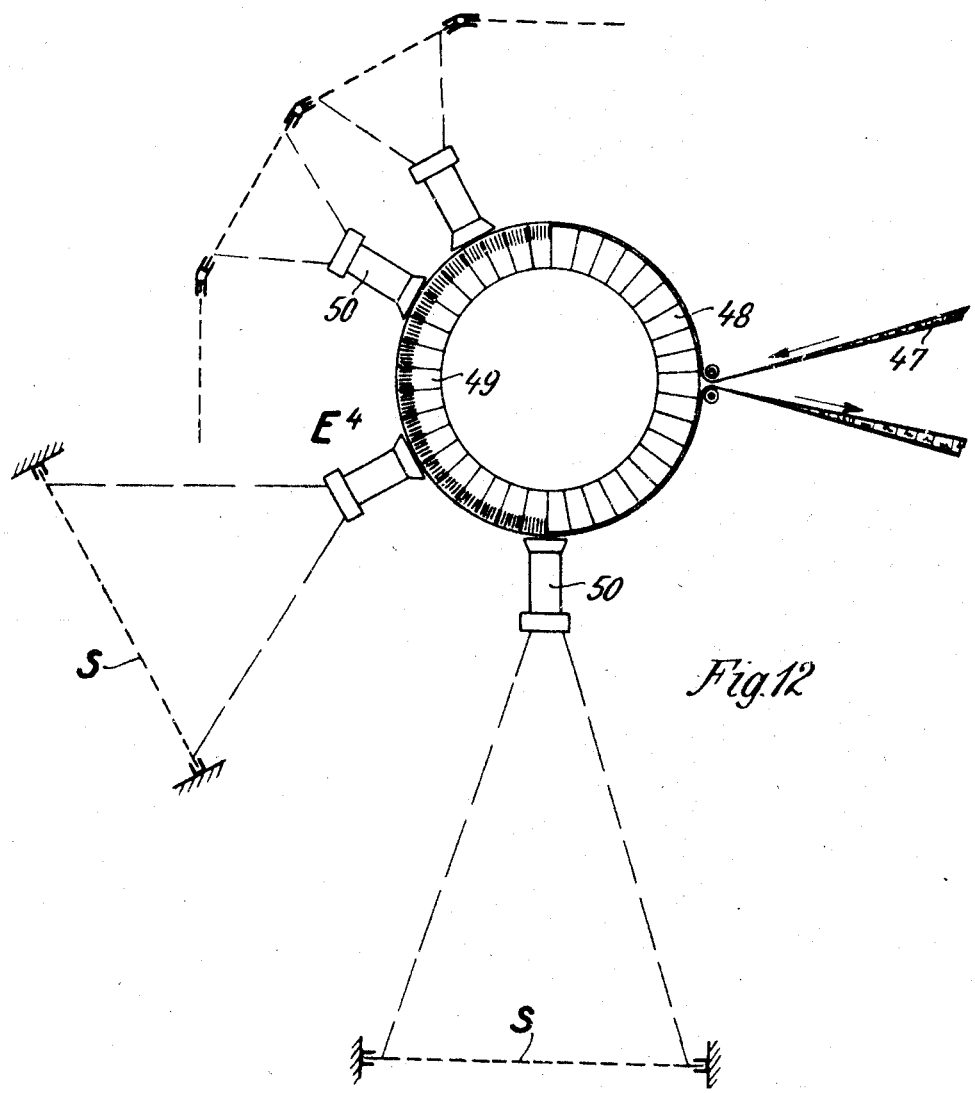

For the purpose of explaining the invention several examples embodying the same have been shown in the accompanying drawings in which the same letters of reference have been used in all of the views to indicate corresponding parts. In said drawings, Fig. 1 is a sectional elevation showing the apparatus, Fig. 2 is a sectional plan view of Fig. 1 taken on the line 2—2, Figs. 3 and 4 are similar plan views showing modifications of the invention, Figs. 5 and 6 are respectively a sectional elevation and a sectional plan view taken on the line 5—5 of Fig. 6 and 6—6 of Fig. 5 and showing another modification of the apparatus suitable for displaying kinematographic films, Fig. 7 is a diagram illustrating the principle of the invention, Fig. 8 is an elevation of Fig. 4, Fig. 9 is a sectional elevation showing another modification, Fig. 10 is a sectional view taken on the line 10—10 of Fig. 9, Fig. 11 is a sectional elevation showing another modification, and Fig. 12 is a sectional plan view of Fig. 11 taken on the line 12—12.

Figure 2:
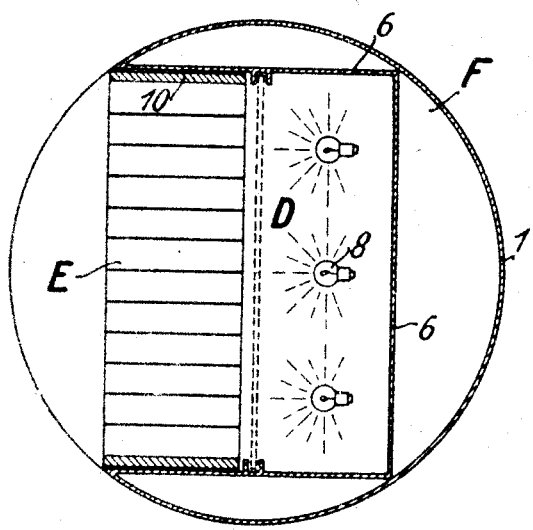

In the example shown in Figs. 1 and 2, the display apparatus comprises a casing F having a cylindrical wall 1 and top and bottom walls 2 and mounted on a vertical shaft A mounted in suitable bearings 4. The casing may be rotated by power means or a motor of any kind, such as an electric motor 7, driving the shaft A of the casing by means of pulleys 3 and 5, and a belt 9. Within the cylindrical casing F there are partitions 6 providing a chamber for mounting the picture D. In the example shown in the figures a translucent picture is provided which is adapted to be illuminated from its rear side by incandescent lamps 8. In front of the picture D, there is a set of exceedingly thin plates E mounted in a frame 10. The said plates do not extend close to the picture 7, but they are slightly spaced therefrom with their inner ends. As shown the plates E are parallel to one another. But I wish it to be understood that I do not limit myself to this feature and that in some cases the said plates are inclined more or less relatively to one another.

Figure 7:
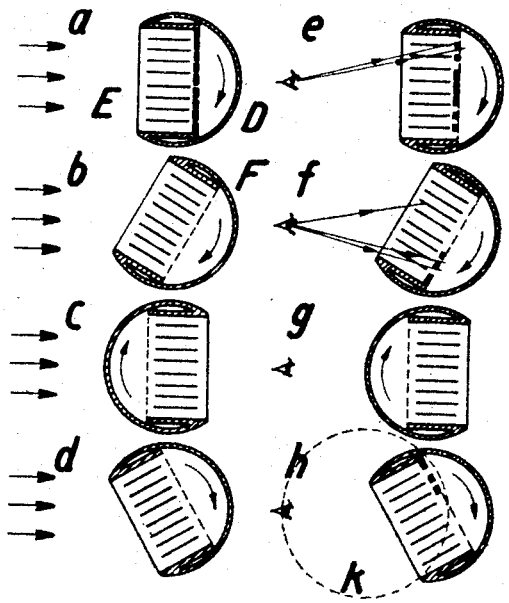

The principle of the invention will be understood from the diagrams shown in Fig. 7. The left hand part of the said diagrams shows how the picture is displayed to an observer standing a comparatively large distance away from the apparatus, the direction of the light rays being indicated by arrows. In Fig. 7a, the direction of the rays is parallel to the direction of the plates E. Therefore, the full picture is displayed to the observer who may in some cases see the thin plates E. After rotating the carrier through an angle of 45° and into the position shown in Fig. 7b, the plates E prevent the passage of the rays from the picture to the eye of the observer, while the picture can be seen by another observer standing laterally of the first-named observer. In Fig. 7c, the picture is displayed to an observer standing at the opposite side of the apparatus, and in Fig. 7d none of the aforesaid observers can see the picture, which however can be seen by an observer looking in the direction of the plates E. It will, therefore, be understood that the picture can be successively inspected by observers standing around the apparatus. If now the apparatus is rotated at high velocity, the impression produced in the eye of the first observer lasts until the apparatus has been rotated through an angle of 360° and the picture is again visible to the first observer. The same applies to other observers standing around the apparatus. Thus the picture can simultaneously be recognized by all the observers standing around the apparatus.

It has been stated above, that when looking at the picture without rotating the same, the plates E are visible on the picture in the form of parallel lines. But I have found that when rapidly rotating the apparatus the said lines disappear, provided that the plates E are slightly spaced with their inner ends from the picture, which will be explained by the fact that when rotating the apparatus through the position represented by Fig. 7a, the passages provided between the plates E are temporarily inclined to the line of sight, so that the observer sees the parts of the picture located behind the plates E.

When looking at the picture at a short distance, as is represented by Figures 7e–7h, the translucent picture seems to be slightly concave, because according to the position of the plates E the median and lateral parts of the picture are successively seen by the observer. In the position of the apparatus shown in Fig. 7e, only the median part of the picture is seen, while at both sides the portions of the picture included between the plates are more or less covered by the plates. In the position of the apparatus shown in Fig. 7f, the left hand part of the picture is perfectly invisible, while the right hand part is completely seen. But the said visible part of the picture is nearer the eye than the parts which before were visible, by reason of the inclined position of the picture. In the position of the apparatus shown in Fig. 7g, no part of the picture can be seen by a person standing at the left of the apparatus, while in the position shown in Fig. 7h, the left hand part of the picture begins to reappear, while the median and right hand parts are not yet visible. In this position of the apparatus, the left hand part of the picture is nearer the eye than the median part thereof. The parts of the picture seen by the observer are located on the circle k shown in Fig. 7h in dotted lines.

The velocity of the rotation of the apparatus required for producing the continuous impression of a picture is from 14 to 16 revolutions per second.

In Fig. 3, I have shown a modification in which two similar pictures $D^1$ are provided which are displayed to opposite sides of the apparatus. Accordingly, the casing is provided at opposite sides with two apertures. In front of each picture, there are sets of thin plates $E^1$ similar in construction and operation as the plates E shown in Figs. 1 and 2. If the pictures $D^1$ exactly correspond to each other in form and relative position, both pictures produce the same impression in the eyes of the observers standing around the apparatus, so that both impressions are added to each other. Therefore, the velocity of rotation of the apparatus may be reduced to one half of the velocity of rotation of the apparatus shown in Figs. 1 and 2.

In Figs. 4 and 8, I have shown another modification, in which the picture $D^2$ is produced on a movable band L. The construction of the casing $F^2$ is similar to the one illustrated in Figs. 1 and 2. Within the casing, there are two sets of vertical rollers 15 having an endless band L trained thereon, which band carries the pictures to be displayed by the apparatus. Any suitable means may be provided for rotating the rollers 15 and advancing the band L. To show what may be done, one of the rollers 15 is provided with a pulley 17 connected by a cord 18 with a stationary pulley 19 disposed concentrically of the shaft 20 carrying the casing $F^2$. Thus, by rotating the casing $F^2$, the pulley 17 and the rollers 15 are rotated, so that the band L slowly travels across the illuminated part of the casing F². If the velocity of the rollers 15 is small, the observer does not perceive the change of the picture displayed by the apparatus.

In Figs. 5 and 6, I have shown my improved system as embodied in a motion picture apparatus. The apparatus comprises a cylindrical casing F³ divided by radial partitions 23 into sectors. On the shaft A³ of the apparatus a concentric tube K is mounted, which extends substantially from the middle of the casing to a point below the bottom wall thereof. The part of the said casing located below the casing F³ is provided with four windows 26 corresponding in position to the larger sectors 27, and at the rear of each window there is a mirror 28, which is inclined downwardly and outwardly from the shaft A³ at an angle of 45°, so that the rays of light passing through the windows are reflected upwardly in a direction parallel to the shaft A³. In the top part of the tube K, there are four mirrors 29 which are inclined so as to reflect the rays impinging thereon into a direction at right angles to the direction of the rays passing through the windows 26 and impinging upon the mirrors 28. Considering a pair of cooperating mirrors 28 and 29, the mirror 28 is inclined downwardly and outwardly from the axis of the apparatus, and the line of intersection of the mirror and the horizontal plane is disposed at right angles to the direction of the incoming rays. The mirror 29 is likewise inclined at an angle of 45°, but the line of intersection of the mirror and the horizontal plane is disposed at an angle of 45° to the direction of the ray passing into the apparatus through the window 26. In Fig. 6 I have indicated the path of a ray reflected by one pair of mirrors by arrows $x$ and $y$. The sectors 27 are provided with translucent screens 30, 30' which are either concentric to the casing, or formed along a chord. In front of the said screens there are shutter plates E³ similar in construction to the shutter plates E shown in Figs. 1 and 2. At the bottom part of the tube K means are provided for training a film band H on the tube with its individual pictures successively covering the windows 26, and around the said bottom part of the tube there is an annular source of light C. Around the top end of the tube K there are optical systems 35 adapted to enlarge the pictures of the film band H and to project the same on the translucent screen 30, 30'.

Rotary movement is imparted to the apparatus by suitable means represented in Fig. 5 by a pulley 34.

In the operation of the apparatus, rotary movement is imparted to the casing F³, and the film band H is made to move with the bottom part of the tube K, so that the individual pictures successively appear before the windows 26. Thus each window is successively covered by each eighth picture of the film band, and the said pictures are projected on the screen 30, 30', the impressions produced by the successive pictures being added to each other thus producing a motion picture. It will be observed that the film band is continuously advanced, and that the pictures projected on the screens 30, 30' are momentarily displayed by reason of the shutters E³. By the rotation of the apparatus, the screens are moved around so that the screens are successively directed to all sides, and the motion picture can be observed from all sides except the side from which the film band is supplied to the tube K. Further, the pictures projected on the four screens successively pass through the same circle and in corresponding positions, so that the impressions produced by the screens on the eye of the observer are added to one another. By disposing the upper reflector 29 so as to reflect the rays in a direction transverse to the direction of the rays passing through the windows the positions of the pictures projected on the screens is at right angles to the position of the pictures of the film, which is necessary in order to produce an upright image from the ordinary film.

In Figs. 9 and 10, I have shown a modification which is similar to the one illustrated in Figs. 5 and 6, in which, however, the motion picture is first projected on a horizontal screen before it is reflected outwardly. As shown in the said figures, the bottom part of a casing 35 is formed with a cylindrical extension 36 formed with four windows 37. The film band 38 is trained on the said extension 36 so that its pictures cover the windows 37. At the rear of each window, there is an inclined mirror 39 adapted to reflect the rays through an optical system 40 and on a horizontal translucent screen 41. Above the screen 41 there is a mirror 42 by means of which the rays are thrown outwardly. In Fig. 10, I have indicated the path of the rays $w$ passing through one set of mirrors. The location of the mirrors 40 and 42 is similar to that described with reference to Figs. 5 and 6. In Figs. 9 and 10, the arrows $z$ and $z'$ indicate the reflected images.

In Figs. 11 and 12, I have shown a modification in which the rays passing through the apparatus are projected by one or more stationary optical systems on one or more stationary screens S. As shown, the apparatus consists of a rotary casing 45 formed with windows 46 and having the film band 47 trained thereon. At the rear of each window, there is a mirror 48, and above each mirror there is a mirror 49, the said mirrors being adapted to erect the pictures of the film band and to throw the same through the stationary optical system 50. For thus reflecting the rays, the mirror 48 is inclined relatively to the horizontal plane, and the line of intersection of the said mirror and the horizontal plane is disposed angularly of the direction of the incoming rays. The mirror 49 is likewise inclined relatively to the horizontal plane, and the line of intersection of the mirror and the horizontal plane is disposed at right angles to the direction of the rays passing through the window 46. By properly positioning the said mirrors an upright image can be produced.

The apparatus 45 is likewise provided with a shutter E⁴.

I wish it to be understood that by means of my improved apparatus not only pictures and signs, but also solid bodies can be made visible from all sides. Further, the means for illuminating the picture have been shown merely by way of example.

I claim:

1. In a display device, the combination of a rotary support, a picture on said support, and a blind on said support subdividing the picture into a plurality of sections rendered consecutively visible during a small fraction of each revolution of said support.

2. An apparatus of the class described comprising, in combination, a rotary support, a picture carried by said support in position to be seen from without said support, means for rotating said support, and plates carried by said support and extending outwardly with relation to said picture, said plates being so spaced that, when rotating said support, they are adapted to cut off the view of said picture except at a given viewpoint during a part of the rotation of said support.

3. In a display device, the combination of a rotary carrier, at least one picture carried by said carrier, means for lighting said picture, a screen carried by said carrier, said screen being adapted to give view to said picture only in a direction substantially perpendicular to the plane of said picture, and means for controlling the movement of said picture, said carrier, and said screen with such a velocity that from any given viewpoint in a circumferential plane about the device, the successive displays of the picture to the eye produce the impression of a continuous picture.

4. In a display device, the combination of a casing, a band of following pictures carried by said casing, means for lighting said band of pictures, a screen carried by said casing, said screen being adapted to give view to said picture only in a direction substantially perpendicular to the plane of said picture, means for controlling the movement of said band of pictures, said casing, and said screen with such a velocity that from any given point of view from a circumferential plane about the device, the successive displays of the picture to the eye added together produce an impression of a continuous picture.

5. In a display device, the combination of a casing, at least one picture carried by said casing, means for lighting said picture, a screen carried by said casing, said screen comprising substantially parallel blades adapted to give view to said picture, substantially perpendicular to the plane of said picture, means for rotating said casing, said picture and said screen with such a velocity that from any given point of view from a circumferential plane about the device, the successive displays of the picture to the eye added together produce an impression of a continuous picture.

6. In a display device, the combination of a rotary casing, a band of following pictures carried by said casing, means for lighting said band of pictures, a screen body carried by said casing, screens carried by said screen body, a drum for supporting said band of pictures disposed laterally of said screen body, windows within said drum, an optical system within said casing and adapted to project said pictures to the screen body and outwardly through said screens, said screens comprising substantially parallel blades adapted to give view to the projection of said pictures inside the screen body substantially perpendicular to said projection, means for rotating said casing, said band of pictures, and said screens with such a velocity that from every point of view from a circumferential plane about the device, the successive displays of the picture to the eye added together produce an impression of a continuous picture.

7. In a display device, the combination of a rotary support, a picture on said support, and a grate-like blind on said support subdividing the picture into a plurality of sections rendered consecutively visible during a small fraction of each revolution of said support.

In testimony whereof I hereunto affix my signature.

AUGUST SCHREIBER.